United States Patent [19]

Shen

[11] 4,193,814

[45] Mar. 18, 1980

[54] BINDING LIGNOCELLULOSIC MATERIALS

[75] Inventor: Kuo-Cheng Shen, Ottawa, Canada

[73] Assignee: Canadian Patents & Development Ltd., Ottawa, Canada

[21] Appl. No.: 898,671

[22] Filed: Apr. 21, 1978

Related U.S. Application Data

[63] Continuation-in-part of Ser. No. 560,131, Mar. 20, 1975, abandoned, which is a continuation-in-part of Ser. No. 338,562, Mar. 6, 1973, abandoned.

[51] Int. Cl.$^2$ .............................................. C08L 97/02
[52] U.S. Cl. .......................... 106/123 LC; 260/124 R
[58] Field of Search .......................................... 106/123

[56] References Cited

U.S. PATENT DOCUMENTS 2,822,358  2/1958  Hearon et al. ...................... 260/124

3,355,400  11/1967  Smith et al. ...................... 106/123 R

FOREIGN PATENT DOCUMENTS 743861  10/1966  Canada .
1223534  8/1966  Fed. Rep. of Germany .

*Primary Examiner*—Theodore Morris
*Attorney, Agent, or Firm*—Ronald G. Bitner

[57] ABSTRACT

A method of making a thermosetting binder for lignocellulosic materials, utilizing spent sulfite liquor, and a method of making a particleboard product. Spent sulfite liquor treated with sufficient sulfuric acid to provide a lignosulfonic acid content of not less than 0.8 milliequivalent weight of NaOH per gram of spent sulfite liquor solids, makes it possible to make particleboard with press time and physical properties comparable to phenol or urea formaldehyde bonded boards but at considerably reduced material cost.

5 Claims, No Drawings

BINDING LIGNOCELLULOSIC MATERIALS

CROSS-REFERENCE TO RELATED APPLICATION

This application is a continuation-in-part of application Ser. No. 560,131, filed Mar. 20, 1975, which is a continuation-in-part of application Ser. No. 338,562, filed Mar. 6, 1973, all now abandoned.

BACKGROUND OF THE INVENTION

This invention relates to a method of making a thermosetting binder for lignocellulosic materials utilizing spent sulfite liquor, and to a method of making particleboard therewith.

The most commonly used adhesive binders for particleboard are urea-formaldehyde and phenol-formaldehyde, with the more expensive phenol-formaldehyde being used for exterior grade products. Conventional binders account for a large portion of the total material cost of particleboard. Therefore, the desirability of using a less expensive material will be readily appreciated.

There have been numerous proposals for utilizing spent sulfite liquor, the by-product of the sulfite pulping process, as the adhesive binder for particleboard but none of these has been entirely satisfactory particularly with regard to reducing the total cost of producing the particleboard. Most prior proposals involve chemical modification of the spent liquor before use as a binder and most of the modified binders contain less than 50% spent sulfite liquor. The actual cost for producing the previously proposed modified spent liquor binders is not significantly lower than that for commercial phenol and ureaformaldehyde. Moreover, few of these modified binders can produce exterior grade particleboard.

In Canadian Pat. No. 743,861 issued Oct. 4, 1966, entitled, "Manufacture of Chipboard and the Like" by A. H. F. Pedersen et al, there is described a method for using spent sulfite liquor for particleboard in which the spent liquor (50% solids solution) is adjusted with acetic acid to a pH of about 3. However, in order to obtain a satisfactory bond, two stages of curing the binder are stated as being essential. In the examples of the Pedersen et al patent, the first step comprises pressing a ½ inch board at 185° C. (365° F.) for 30 minutes. In the second step, the board is placed in an autoclave and heated to 195° C. (383° F.) for 80 minutes under pressure. In that process the advantage of using the much cheaper spent liquor as binder is greatly diminished by the cost of long pressing time, i.e. 30 minutes instead of about 8 minutes for board made with phenol-formaldehyde binder, and considerably longer for the autoclave step.

It is indicated in West German Pat. No. 1,223,534, to W. Arnoldt, published Aug. 25, 1966, that it is known that particleboard may be produced from cellulose containing materials bonded by sulfite liquor treated with sulfuric acid to obtain a pH of about 1. It is stated that hot-pressing at 160°–180° C. at about 20 Kg/cm² pressure, the required press time is in the range from 1.5 to 2 minutes per millimeter of board thickness. However, because of the long press times required, this binder was not considered satisfactory even for interior grade boards and improved results are claimed with the addition of aminoplast condensates (urea and/or melamine formaldehyde).

Earlier experiments by applicant, for example those described in applicant's aforesaid earlier applications, appeared to contradict these teachings, and specifically, appeared to indicate that spent sulfite liquor treated to a pH of 1 could provide an acceptable adhesive. However, it was subsequently found that the pH measurement technique used was inaccurate, due to inadequate electrode emersion times, and that, in fact, the pH of the spent sulfite liquor used was actually considerably lower than 1.

It was subsequently also found that pH alone is not a reliable measure of compositions suitability as an adhesive. Using conductometric titration, it was found that the treatment of spent sulfite liquor with sulfuric acid produces both strong and weak acids, and experiments indicated that only the strong acid constituent is useful in terms of adhesive properties. The weak, mainly organic, acids produced affect the pH or total acid measurement but do not appear to enhance the adhesive properties.

Furthermore, the experiments suggest that it is the lignosulfonic acid which provides the adhesive properties of the acid treated spent sulfite liquor. Although it cannot be stated with certainty that lignosulfonic is the only useful constituent in the acid treated liquor, it can be said that the efficiency of the treated liquor is directly related to the amount of lignosulfonic acid produced.

SUMMARY OF THE INVENTION

It has been found that the efficiency of sulfuric acid treated spent sulfite liquor as a binder for lignocellulosic materials can be conveniently and reliably indicated by determining the concentration of lignosulfonic acid.

In accordance with the present invention, a thermosetting binder for lignocellulosic materials is provided by treating a concentrate of spent sulfite liquor with sulfuric acid to provide a lignosulfonic acid content of not less than 0.8 meg. wt. (milliequivalent weight) of NaOH per gram of spent sulfite liquor solids, and not substantially greater than that required to release all the available lignosulfonic acid.

Particleboard can be made by mixing the treated spent sulfite liquor with lignocellulosic particles in proportions of at least 3% treated spent sulfite liquor solids based on lignocellulosic particle weight, forming a mat with the mixture and hot pressing that mat at a temperature of not less than 177° C. for a time sufficient to cure the binder.

DESCRIPTION OF PREFERRED EMBODIMENTS

The most commonly available forms of spent sulfite liquor are calcium, ammonium, magnesium or sodium based liquors. Although the pulping operation produces a liquor having a solids content of about 10%, spent sulfite liquor is most commonly commercially available as either a 50% solids solution or a powder. Since for particleboard manufacture, the moisture content of the mat prior to hot pressing should preferably be about 3 to 7%, the use of a spent sulfite liquor as a concentrate or in dry form is preferred.

In providing an adhesive composition for binding lignocellulosic materials in accordance with the present invention, the optimum quantities of sulfuric acid used to treat the spent sulfite liquor will depend on the following criteria:

(a) The bond quality desired:

Generally there are two types of particleboard based upon the resin binder used. The "waterproof" board is conventionally made with phenolic resin and the "water resistant" board with urea resin. The former can withstand full weathering for exterior application and will not disintegrate when subjected to the boil test. The latter cannot withstand longterm full weathering and is limited to interior application. It will completely disintegrate when subjected to the boil test. The composition of the present invention allows making exterior grade boards with press times comparable to that of the commonly used expensive phenol-formaldehyde. Increasing the amount of lignosulfonic acid in the binder reduces the press time required to obtain an exterior grade board.

(b) Press time:

Press time is an important consideration in particleboard manufacture as it has a direct effect on productivity. Generally, press times are minimized by maximizing press temperatures. With the composition of the present invention, the press time required for a specified grade of board can be reduced by increasing the quantity of lignosulfonic acid in the treated composition. In selecting a suitable adhesive composition, consideration will be given to the press time required to obtain an equivalent product with conventional adhesives.

(c) The chemical composition of the spent sulfite liquor used:

The composition or the base type of available spent sulfite liquor may vary. It may be necessary to add more sulfuric acid to some spent sulfite liquors than others to obtain a predetermining amount of lignosulfonic acid. For example, magnesium based spent sulfite liquor requires considerably more sulfuric acid addition, than the calcium, sodium or ammonium based type, to obtain the same amounts of lignosulfonic acid. Also affecting the amount of sulfuric acid required is any unused sulfite in the liquor.

Considering the above criteria and the results of experiments, it appears that a suitable adhesive composition for binding lignocellulosic materials to allow making an exterior grade particleboard (CSA 0188 (75) standard) with reasonable press times can be provided by treating spent sulfite liquor with sufficient sulfuric acid to provide a lignosulfonic acid content of not less than 0.8 meg. wt. of NaOH per gram of spent sulfite liquor solids. It will be understood by those skilled that the meg. wt., or milliequivalent weight, of a substance participating in a neutralizing reaction refers to that weight which reacts with 1 milligram formula weight of hydrogen ions in that reaction.

With a lignosulfonic acid content of not less than 1.2 meg. wt., an exterior grade particleboard can be obtained with press times comparable to that using phenol-formaldehyde as binder. The meg. wt. range of 0.8 to 1.2 is more suitable for interior grade products.

The maximum of sulfuric acid added should not be more than that required to release all available lignosulfonic acid. For commercially available spent sulfite liquor, this is normally not more than 2 meg. wt. of NaOH per gram of solids. Amounts of sulfuric acid in excess of this results in unnecessarily high acidity of the pressed product, which may be corrosive to nails or other hardware used with the board and a destructive effect on the wood making up the board.

For the purposes of comparison with the more commonly used pH values, the corresponding approximate pH values for commercially available calcium sodium, or ammonium spent sulfite liquor treated with sulfuric acid to provide a lignosulfonic acid content of 0.8 milliequivalent weight of NaOH per gram of spent sulfite liquor solids, is a pH of about 0.6. However, as discussed heretofore, pH measurement is not a reliable method of determining the quality of a spent sulfite liquor based binder.

Determination of the lignosulfonic acid concentration of the acid treated spent sulfite liquor may be done by sulfonate-sulfur analysis. For binders obtained from calcium, sodium, or ammonium based liquors, conductometric titration provides a simpler and reliable method of measuring lignosulfonic acid content. Although conductometric titration does not measure lignosulfonic acid, per se, but rather the strong acid content, the strong acid for the above three liquors consists mainly of lignosulfonic acid and therefore for practical purposes, this measurement technique is suitable. However, for magnesium based spent sulfite liquor, the strong acid produced will comprise a substantially reduced proportion of lignosulfonic acid, and additional sulfonate-sulfur analysis may be used to indicate the lignosulfonic acid content.

The preferred form of the binder is as a dry powder, which may be provided by spray drying. The spray drying temperature should be limited to avoid a substantial loss of solubility with a resulting loss of efficiency of the binder.

Preferably the spray dried binder is provided with a particle size of less than 200 mesh. It has been found that a particle size greater than 200 mesh reduces the efficiency of the binder, apparently due to lower plasticity as compared with conventional binders.

Particleboard may be made by mixing the treated spent sulfite liquor with lignocellulosic particles in proportions of at least 3% treated spent sulfite liquor solids based on lignocellulosic particle weight, forming a mat with the mixture and hot pressing that mat at a temperature of not less than 177° C. for a time sufficient to cure the binder.

The following examples illustrate details of the present invention. It will be noted that some examples refer to CSA-0188 (75), the Canadian Standard for particleboard, which specifies that the standard internal bond strength test, (tensile strength perpendicular to the plane of the board is psi) as a measure of the bond quality between particles. However, a torsion-shear technique has been used instead which has been found to be reliable and much simpler. It was found that torsion-shear in terms of in.-lb is about equivalent to internal bond strength in terms of psi.

EXAMPLE 1

A calcium based spent sulfite liquor of 50% solids was obtained from a Canadian sulfite mill. Concentrated sulfuric acid (95% conc. technical grade) was added to the spent sulfite liquor with stirring at room temperature. Three batches of spent sulfite liquor were acidified with 8, 9 and 10% sulfuric acid (based on the weight of spent sulfite liquor solids) respectively and then spray dried at an inlet temperature of 135° C. and outlet temperature of 95° C. in a laboratory spray dryer (Bowen No. BE-1031) with a feeding rate of 80–90 cc/min. The spray dried binder powders were ball-milled to a fine particle size of about 200 mesh, tyler screen, before use. Poplar wafers obtained from a Canadian waferboard plant were first sprayed with 2.0% by weight, of wax emulsion (Hercules 1419, 50% solids) and then mixed with 4.5% by weight of the acid treated spent sulfite liquor powder. A total of 9 waferboards (7/16×24×24 inch and specific gravity of 0.65) were made with three binder powders treated with different percentages of sulfuric acid All boards were pressed at 204° C. under a pressure of 400 psi for 5, 7 and 9 minutes. Strength properties of the poplar waferboards and the lignosulfonic acid content (milliequivalent weight NaOH) of the three binders are given in Table 1.

TABLE 1

| Total Acid (meq. wt. NaOH per g. solids) | Lignosulfonic Acid (meq. wt. NaOH per g. solids) | Press Time (min.) | MOR(psi) | | Max. Torque (in-lb) | |
|---|---|---|---|---|---|---|
| | | | Dry | Wet* | Dry | Wet* |
| 1.47 | 0.98 | 5 | 2970 | 1000 | 69 | 5 |
| 1.69 | 1.20 | 5 | 3305 | 1200 | 68 | 11 |
| 1.86 | 1.39 | 5 | 3170 | 1440 | 63 | 18 |
| 1.47 | 0.98 | 7 | 3280 | 1350 | 63 | 16 |
| 1.69 | 1.20 | 7 | 3060 | 1510 | 70 | 24 |
| 1.86 | 1.39 | 7 | 3000 | 1550 | 71 | 22 |
| 1.47 | 0.98 | 9 | 3370 | 1580 | 62 | 19 |
| 1.69 | 1.20 | 9 | 3110 | 1620 | 65 | 23 |
| 1.86 | 1.39 | 9 | 3320 | 1580 | 66 | 35 |
| CSA Standard (CSA 0188 (75)) | | | 2000 | 1000 | 40 | |

*Specimens were boiled in water for 2 hours and tested wet.

EXAMPLE 2

Spent sulfite liquors of different bases were treated with varied amounts of sulfuric acid to produce binders. The total acid values given were obtained by potentiometric titration. Lignosulfonic acid content was determined by conductometric titration and sulfonate-sulfur analysis. Table 2 summarizes the physical properties of poplar waferboard bonded with acid treated liquid spent sulfite liquor (SSL) in proportion of 4.5% spent sulfite liquor solids based on wood particle weight. All boards were pressed at 204° C. with a pressure of 400 psi for 6 minutes. Board thickness was 7/16 inch and density about 40 pcf. The results indicate that the quantity of lignosulfonic acid is a more reliable indication of binder efficiency than pH or total acid measurement.

TABLE 2

| SSL Base | Total Acid (meq. wt. NaOH per g. solids) | Lignosulfonic Acid (meq. wt. NaOH per g. solids) | pH | MOR(psi) | | Torsion-Shear (in-lb) | |
|---|---|---|---|---|---|---|---|
| | | | | Dry | Wet* | Dry | Wet* |
| Ca | 1.90 | 1.43 | 0.1 | 2810 | 1600 | 104 | 24 |
| Na | 2.18 | 1.71 | 0.1 | 2780 | 1660 | 81 | 25 |
| NH$_4$ | 1.94 | 1.47 | 0.1 | 2930 | 1560 | 90 | 28 |
| Mg | 1.96 | 0.74 | 0.1 | 2770 | 0 | 83 | 0 |
| Mg | 3.71 | 1.59 | 0.1 | 2610 | 1550 | 74 | 21 |
| CSA 0188 (75) requirement | | | | 2000 | 1000 | 40 | |

*Specimens were boiled in water for 2 hours and tested wet.

I claim:
1. A method of making a thermosetting binder for lignocellulosic materials, comprising treating a concentrate of spent sulfite liquor with sufficient sulfuric acid to produce a lignosulfonic acid content of not less than 0.8 milliequivalent weight of NaOH per gram of spent sulfite liquor solids, the amount of sulfuric acid being not substantially greater than that required to release all the available lignosulfonic acid.
2. The method of claim 1 wherein the milliequivalent weight is not less than 1.2 per gram of spent sulfite liquor solids.
3. The method of claim 1 wherein the milliequivalent weight is not greater than 2 per gram of spent sulfite liquor solids.
4. The composition produced by the method of claim 3.
5. The method of claim 1 further comprising mixing the treated spent sulfite liquor with lignocellulosic particles in proportions of at least 3% treated spent sulfite liquor solids based on lignocellulosic particle weight, forming a mat with the mixture and hot pressing that mat at a temperature of not less than 177° C. for a time sufficient to cure the binder.

* * * * *